United States Patent [19]

Lox et al.

[11] Patent Number: 5,045,521

[45] Date of Patent: * Sep. 3, 1991

[54] CATALYST FOR THE PURIFICATION OF EXHAUST GASES OF INTERNAL COMBUSTION ENGINES WITH REDUCTION OF HYDROGEN SULFIDE EMISSION

[75] Inventors: Egbert Lox, Hanau; Edgar Koberstein, Alzenau; Bernd Engler, Hanau, all of Fed. Rep. of Germany

[73] Assignee: Degussa Aktiengesellschaft, Frankfurt am Main, Fed. Rep. of Germany

[ * ] Notice: The portion of the term of this patent subsequent to Oct. 16, 2007 has been disclaimed.

[21] Appl. No.: 402,619

[22] Filed: Sep. 5, 1989

[30] Foreign Application Priority Data

Sep. 7, 1988 [DE] Fed. Rep. of Germany ....... 3830319

[51] Int. Cl.$^5$ ............................ B01J 23/00; B01J 8/00; C01B 21/00
[52] U.S. Cl. .................................. 502/304; 423/213.5
[58] Field of Search ...................... 502/304; 423/213.5

[56] References Cited

U.S. PATENT DOCUMENTS

| | | |
|---|---|---|
| 4,005,177 | 1/1977 | Weidenbach et al. ............ 423/213.5 |
| 4,122,039 | 10/1978 | Kobylinski et al. ............... 423/213.5 |
| 4,581,343 | 4/1986 | Blanchard et al. ................. 502/241 |
| 4,963,521 | 10/1990 | Engler et al. ..................... 423/213.5 |

FOREIGN PATENT DOCUMENTS 2146261 10/1985 United Kingdom ................... 55/84

*Primary Examiner*—Gregory A. Heller
*Attorney, Agent, or Firm*—Beveridge, DeGrandi & Weilacher

[57] ABSTRACT

An oxidizing and/or reducing exhaust gas purification catalyst with a reduced tendency to emit $H_2S$ contains active $Al_2O_3$ as carrier which is charged with $CeO_2$ and optionally $ZrO_2$ as well as Pt, Pd and/or Rh and, in addition, 0.1 to 40% by weight ZnO relative to $Al_2O_3$.

16 Claims, No Drawings

CATALYST FOR THE PURIFICATION OF EXHAUST GASES OF INTERNAL COMBUSTION ENGINES WITH REDUCTION OF HYDROGEN SULFIDE EMISSION

INTRODUCTION AND BACKGROUND

The present invention relates to a catalyst for the purification of the exhaust gases of internal combustion engines by means of oxidation and/or reduction. In a further aspect, the present invention relates to a method of preparation of the catalyst and usage thereof. The catalysts can contain the platinum group metals platinum, palladium and rhodium individually or in combination. According to one aspect, the catalyst can be used, depending on composition, as the reduction catalyst of a double-bed reactor. In this case the exhaust gas is first supplied to a reducing catalyst and then after the admixture of air to an oxidizing catalyst. In another aspect, the catalyst can be used as a multifunctional catalyst for the simultaneous conversion of the oxidizable and the reducible components of the exhaust gas.

Motor exhaust gas catalysts, especially those with high cerium oxide content, are able to bind sulfur oxides under oxidizing exhaust gas conditions. However, during periods of travel when conditions change to reducing exhaust gases, the amounts of sulfur oxide stored in this manner can be released again in part as hydrogen sulfide.

Since motor exhaust gases can contain sulfur dioxide due to a use of sulfur-containing fuels and since the exhaust gas catalyst encounters both oxidizing and also reducing conditions depending on the manner of driving, hydrogen sulfide can be emitted when using auto exhaust gas catalysts. As a result, the $H_2S$ odor limits can be distinctly exceeded for a brief period.

It has been known for some time that nickel containing catalysts exhibit only very slight emissions of hydrogen sulfide. However, the use of nickel as a component in motor exhaust gas catalysts is controversial on account of its carcinogenic action. It should therefore fundamentally be avoided.

There is therefore a need, for environmental reasons, for nickel-free motor exhaust gas catalysts with a reduced tendency to emit hydrogen sulfide.

The present invention is an improvement with respect to the general teaching of DE-PS No. 29 07 106 for the formulation of exhaust gas purification catalysts. This prior art publication in essence describes an exhaust gas catalyst with an active phase consisting of 0.03 to 3% by weight platinum and rhodium and optionally nickel which is applied onto aluminum oxide of the transition series and is obtained by impregnating the optionally lattice-stabilized carrier with an aqueous solution of a salt of platinum and rhodium and optionally of nickel. The resulting product is dried and treated in a gas current containing hydrogen at 250° to 650° C. The catalyst also contains 5 to 15% by weight of a mixture of $CeO_2$ and $ZrO_2$ in weight ratios of 20:80 to 80:20 and 1 to 10% by weight $Fe_2O_3$. This mixture is impregnated before the addition of the noble metals with an aqueous solution of cerium salt, zirconium salt and iron salt or mixed with their oxides and subsequently tempered 30 to 180 min. in air at 500°-700° C. Without a nickel content, these catalysts result in an exhaust gas with a distinct $H_2S$ odor, so that the problem arose of eliminating the unwanted exhaust gas odor with other means. It is possible, by means of a modification of the nickel-free composition, which can extend in the same manner to the oxide component and the finished catalyst, and especially by also using zinc oxide in the known formulations, which have optionally been broadened in their amount, to eliminate practically completely this deficiency. Even in the case of elevated cerium oxide content of the catalyst, which is especially critical as regards the tendency to $H_2S$ emission this problem can be largely avoided.

SUMMARY OF THE INVENTION

One object of the invention is to provide a catalyst for the purification of the exhaust gases of internal combustion engines which employ aluminum oxide of the transition series as a carrier, and contains 2 to 70% by weight $CeO_2$ and 0 to 20% by weight $ZrO_2$ and with a catalytically active phase consisting of 0.01 to 3% by weight platinum, palladium and/or rhodium applied onto the carrier. In this aspect of the invention a weight ratio is selected between platinum and/or palladium and the optionally present rhodium of 2:1 to 30:1. The catalyst is optionally present in the form of a coating on a honeycombed, inert carrier of ceramic or metal; or on a foamed ceramic carrier in an amount of 5 to 30% by weight relative to the weight of the carrier.

The catalyst of the present invention is characterized in that it contains 0.1 to 40, preferably 0.5 to 20% by weight ZnO relative to $Al_2O_3$.

The action of the catalyst of the invention can be differentiated in that it also contains, in addition to the $CeO_2$ and, optionally, the $ZrO_2$ as components which modify the carrier material, one or more of the compounds $Fe_2O_3$, BaO, CaO, $La_2O_3$ and/or other rare earth metal oxides in a range from 0.5 to 20% by weight. Among other things, naturally occurring oxide mixtures of rare earths can be used.

The catalyst can, as already mentioned, be present in the form of a coating on a honeycombed carrier of ceramic or metal or as bulk material catalyst or as honeycombed, monolithic solid one-piece extrudate (in which the honeycombed monolith consists totally of the catalyst) or as foamed ceramics.

Another aspect of the invention relates to a method of preparing the described catalyst. It is characterized by impregnating the optionally lattice-stabilized carrier with an aqueous solution of cerium salt and, optionally, zirconium salt. Alternatively, the optionally lattice-stabilized carrier can be mixed with an aqueous suspension of their oxides, hydroxides or carbonates. Subsequently tempering is carried out in air at 500° to 900° C. Then the catalytically active component is applied by impregnating the carrier with an aqueous solution of a salt of the noble metals, drying and treating it, optionally in a gas current containing hydrogen at temperatures of 250° to 650° C. The ZnO content is introduced by impregnating the carrier material with zinc salt and cerium salt and, optionally, zirconium salt or by impregnating the carrier material which already contains $CeO_2$ and optionally $ZrO_2$ before the application of the noble metal component with a dissolved or dispersed, zinc-containing compound or by subsequently impregnating the finished catalyst with a dissolved, zinc-containing compound as well as drying and thermally activating it at temperatures of 150° to 650° C.

A further aspect of the invention resides in the use of the catalyst as oxidation catalyst and/or reduction catalyst for the purification of the exhaust gases of internal combustion engines with decrease in the emission of hydrogen sulfide.

The doping of the carrier component with $CeO_2$ and, for example, $ZrO_2$ as well as the application of the active noble metals takes place essentially according to the measures described in DE-PS No. 29 07 106. The doping with ZnO can takes place in a simple manner by means of a zinc salt in aqueous solution. The zinc oxide can also be added to the doping solution as a solid.

The carrier material, e.g. $\tau$-aluminum oxide and/or another crystal phase from the transition series to $\alpha$-aluminum oxide, can be lattice-stabilized by impregnating with solutions of salts of the alkaline earth metals, of zirconium and of elements of the rare earth series as well as of silicon containing compounds. Subsequent heating lasting approximately 4 to 12 hours is carried out. Instead of the impregnation, a coprecipitation of salts of aluminum and the stabilizer precursor can take place.

Depending on the selection of the composition of the catalyst, either an only reducing, or a successively oxidizing and reducing, or a simultaneously oxidizing and reducing exhaust gas purifying system can be created. Reduction catalysts contain as active phase preferably platinum and rhodium. Double bed systems contain as active phase a first catalyst containing platinum and rhodium and a second catalyst containing platinum, platinum/palladium, platinum/rhodium or platinum/palladium/rhodium. Multifunctional catalysts preferably contain platinum/rhodium or platinum/palladium/rhodium as the active phase.

DETAILED EMBODIMENTS OF THE INVENTION

EXAMPLE 1

A three-way catalyst of the pellet type, designated as catalyst A, was prepared. As a carrier $\tau$-aluminum oxide pellets with a diameter of 3 mm and a specific surface of 120 m$^2$/g were used. 7.6% by weight $CeO_2$ and 0.6% by weight $ZrO_2$ was brought into the carrier material by means of impregnating with an aqueous solution of the particular acetates, drying at 120° C. and calcining at 600° C. in air.

Furthermore, the noble metals platinum, palladium and rhodium in a weight ratio of Pt:Pd:Rh=4:12:1 were introduced by means of impregnating with a solution of platinum nitrate, palladium chloride and rhodium chloride, drying and tempering at 600° C. in a current of air. The catalyst finally contained 0.029% by weight Pt, 0.087% by weight Pd and 0.007% by weight Rh. The weight data is relative in each instance to the weight of the $\tau$-aluminum oxide.

Another pellet catalyst with the designation catalyst B was prepared. The preparation correspond to that of catalyst A with the exception that ZnO was also added as zinc acetate as was the case with the introduction of Cerium and zirconium.

Finished catalyst B contained 7.6% by weight $CeO_2$, 0.6% by weight $ZrO_2$, 0.029% by weight Pt, 0.087% by weight Pd, 0.007% by weight Rh and 2% by weight ZnO relative in each instance to the amount of aluminum oxide.

The hydrogen sulfide emission of catalysts A and B was determined in a two stage method in a synthesis gas reactor. The first stage was performed under the following test conditions:

| | |
|---|---|
| Temperature: | 450° C. |
| Space velocity: | 66,000 liters exhaust gas volume/h/liter catalyst volume |
| Duration: | 1 hour |
| Gas composition: | lean: = 1.004 |

| | | |
|---|---|---|
| CO: 1.0% by vol. | SO$_2$: 20 ppm | O$_2$: 1.05% by vol. |
| C$_3$H$_6$: 0.033% by vol. | CO$_2$: 14% by vol. | N$_2$: remainder |
| C$_3$H$_8$: 0.017% by vol. | H$_2$O: 10% by vol. | |
| NO: 0.10% by vol. | H$_2$: 0.33% by vol. | |

At the end of the first testing stage, the gas composition was switched at a constant temperature and space velocity to "rich" (=0.92); the exhaust gases were collected during the first two minutes after the switching and the average hydrogen sulfide content determined.

The gas composition in the second stage was:

| | | |
|---|---|---|
| CO: 2.1% by vol. | SO$_2$: 20 ppm | O$_2$: 0.25% by vol. |
| C$_3$H$_6$: 0.033% by vol. | CO$_2$: 14% by vol. | N$_2$: remainder |
| C$_3$H$_8$: 0.017% by vol. | H$_2$O: 10% by vol. | |
| NO: 0.10% by vol. | H$_2$: 0.71% by vol. | |

The emission of hydrogen sulfide determined in this manner was 80 mg/m$^3$ in the case of catalyst A and only 18 mg/m$^3$ in the case of catalyst B.

EXAMPLE 2

4 other catalysts were prepared which are designated as catalysts C, D, E and F.

Catalyst C was prepared in two steps. In the first step, a monolith consisting of cordierite with 61 cells/cm$^2$ was coated with a coating suspension consisting of a 35% by weight aqueous dispersion $\tau$-Al$_2$O$_3$ doped with 2.2% by weight ZrO$_2$, 11.1% by weight La$_2$O$_3$ and 22.2% by weight CeO$_2$.

The weight data refers in each instance to the amount of $\tau$-aluminum oxide.

The monolith coated in this manner was dried for 30 minutes at 250° C. and subsequently tempered 2 hours at 700° C. in an atmosphere of air.

In the second step the noble metals platinum and rhodium were applied in a weight ratio of Pt:Rh=5:1 by immersing the monolith coated with the coating suspension in an aqueous solution of platinum nitrate and rhodium nitrate. The excess solution was blown out with air. The catalyst was then dried at 250° C. for 30 minutes and subsequently activated for 30 minutes at 500° C. in a current of air. It was finally reduced for 4 hours at 700° C. in a current of hydrogen.

The finished catalyst, designated with C, contained 0.87% by weight Pt and 0.17% by weight Rh relative in each instance to the amount of aluminum oxide.

Catalyst D was prepared in three steps. The first step is identical to the first step of the preparation of catalyst C. In the second step the monolith coated with the same coating suspension as catalyst C was immersed in a saturated aqueous solution of zinc acetate. The excess solution was blown out with air and the catalyst subsequently dried for 30 minutes at 250° C. and tempered for 2 hours at 600° C.

In the third step the noble metals platinum and rhodium were applied in accordance with the second preparation step of catalyst C.

Finished catalyst D contained 0.87% by weight Pt, 0.17% by weight Rh, 22.2% by weight CeO$_2$, 11.1% by weight La$_2$O$_3$, 2.2% by weight ZrO$_2$ and 7.4% by weight ZnO relative in each instance to the amount of aluminum oxide.

Catalyst E was prepared in like manner to catalyst D with the exception that it was immersed twice in the saturated solution of zinc acetate with intermediate blowing-out of the excess solution with air and a subsequent 30-minute drying at 250° C.

Finished catalyst E contained 0.87% by weight Pt, 0.17% by weight Rh, 22.2% by weight CeO$_2$, 11.1% by weight La$_2$O$_3$, 2.2% by weight ZrO$_2$ and 17.5% by weight ZnO relative in each instance to the amount of aluminum oxide.

Catalyst F was prepared just as catalyst D with the exception that it was immersed three times in the solution of zinc acetate with intermediate blowing-out of the excess solution with air and a 30-minute drying at 250° C.

Finished catalyst F contained 0.87% by weight Pt, 0.17% by weight Rh, 22.2% weight CeO$_2$, 11.1% by weight La$_2$O$_3$, 2.2% by weight ZrO$_2$ and 27.4% by weight ZnO.

The H$_2$S emission of catalysts C, D, E and F was measured according to the method described in example 1.

The results collated in the following table show that the H$_2$S emission of the catalysts can be considerably decreased by adding ZnO.

| Catalyst | ZnO content % by weight | H$_2$S emission mg/m$^3$ |
| --- | --- | --- |
| C | 0 | 69 |
| D | 7.4 | 66 |
| E | 17.5 | 30 |
| F | 27.4 | 24 |

Further variations and modifications of the invention will be apparent to those skilled in the art upon a reading of the foregoing and are intended to be encompassed by the claims appended hereto.

German priority application No. P 38 30 319.1-41 is relied on and incorporated herein.

What is claimed is:

1. A catalyst for the purification of the exhaust gases of internal combustion engines comprising an aluminum oxide of the transition series as the carrier, 2 to 70% by weight CeO$_2$ 0 to 20% by weight ZrO$_2$ and with an active phase of 0.01 to 3% by weight platinum, palladium and/or rhodium applied onto the carrier, with a weight ratio between platinum and/or palladium and the optionally present rhodium of 2:1 to 30:1, and further containing 0.1 to 40% by weight of ZnO based on the aluminum oxide.

2. The catalyst according to claim 1 wherein the catalyst is present in the form of a coating on a honeycombed, inert carrier of ceramic or metal or on a foamed ceramic carrier in an amount of 5 to 30% by weight relative to the weight of the carrier.

3. The catalyst according to claim 1 wherein the ZnO is present in the amount of 0.5 to 20% by weight.

4. The catalyst according to claim 1, which further contains 0.5 to 20% by weight Fe$_2$O$_3$, BaO, CaO, La$_2$O$_3$ and/or other rare earth metal oxides.

5. The catalyst according to claim 1 wherein the ZrO$_2$ is present in the amount of 0.5 to 20% by weight.

6. A method of preparing a catalyst for the purification of gases of an internal combustion engine
comprising an aluminum oxide of the transition series as the carrier, 2 to 70% by weight CeO$_2$, 0 to 20% by weight ZrO$_2$ and with an active phase of 0.01 to 3% by weight platinum, palladium and/or rhodium applied onto the carrier, with a weight ratio between platinum and/or palladium and the optionally present rhodium of 2:1 to 30:1, and further containing 0.1 to 40% by weight of ZnO based on the aluminum oxide,
said method comprising impregnating an aluminum oxide of the transition series carrier with a cerium salt, tempering in air at 500° to 900° C., impregnating the carrier with a salt of a noble metal selected from the group consisting of platinum, palladium, rhodium and mixtures thereof, a first drying and heating at temperatures of 250° to 650° C., impregnating the material with zinc salt and a second drying.

7. The method according to claim 6 wherein said carrier is lattice stabilized.

8. The method according to claim 6 wherein said cerium salt is in the form of an aqueous solution.

9. The method according to claim 6 wherein a zirconium salt is also used to impregnate said carrier.

10. The method according to claim 6 wherein the carrier is mixed with an aqueous suspension of the oxide, hydroxide or carbonate of cerium.

11. The method according to claim 6 wherein after said first drying the carrier is subjected to a hydrogen gas containing current.

12. A method of preparing a catalyst for the purification of the exhaust gases of an internal combustion engine
comprising an aluminum oxide of the transition series as the carrier, 2 to 70% by weight CeO$_2$, 0 to 20% by weight ZrO$_2$ with an active phase of 0.01 to 3% by weight platinum, palladium and/or rhodium applied onto carrier, with a weight ratio between platinum and/or palladium and the optionally present rhodium of 2:1 to 30:1, and further containing 0.1 to 40% by weight of ZnO based on the aluminum oxide,
said method comprising impregnating a carrier formed of aluminum oxide of the transition series with an aqueous solution of cerium salt and, optionally, zirconium salt or by mixing the carrier with an aqueous suspension of their respective oxide, hydroxide or carbonate, tempering in air at 500° to 900° C.; impregnating the carrier with an aqueous solution of a salt of a noble metal selected from the group consisting of platinum, palladium and rhodium and mixtures thereof, drying and treating it, optionally in a gas current containing hydrogen at temperatures of 250° to 650° C., introducing ZnO by impregnating the carrier with a zinc salt and drying.

13. The method according to claim 12 wherein the zinc salt and a cerium salt are used.

14. The method according to claim 12 wherein the carrier which already contains CeO$_2$ and optionally ZrO$_2$ is impregnated before the application of the noble metal component with a dissolved or dispersed, zinc-containing compound.

15. The method according to claim 12 wherein the finished catalyst is impregnated with a dissolved, zinc-containing compound.

16. The method according to claim 12 wherein the catalyst is thermally activated by heating at temperatures of 150° to 650° C.

* * * * *